(12) United States Patent
Yang

(10) Patent No.: US 10,262,804 B2
(45) Date of Patent: Apr. 16, 2019

(54) ELECTRIC VEHICLE AND CAPACITOR THEREOF

(71) Applicant: BYD Company Limited, Shenzhen (CN)

(72) Inventor: Wei Yang, Shenzhen (CN)

(73) Assignee: BYD Company Limited (CN)

( * ) Notice: Subject to any disclaimer, the term of this patent is extended or adjusted under 35 U.S.C. 154(b) by 192 days.

(21) Appl. No.: 15/306,392

(22) PCT Filed: Feb. 13, 2015

(86) PCT No.: PCT/CN2015/073010
§ 371 (c)(1),
(2) Date: Oct. 24, 2016

(87) PCT Pub. No.: WO2015/161712
PCT Pub. Date: Oct. 29, 2015

(65) Prior Publication Data
US 2017/0062137 A1 Mar. 2, 2017

(30) Foreign Application Priority Data

Apr. 22, 2014 (CN) .................... 2014 2 0198946 U

(51) Int. Cl.
*H01G 4/38* (2006.01)
*H01G 4/224* (2006.01)
(Continued)

(52) U.S. Cl.
CPC .............. *H01G 4/40* (2013.01); *B60L 11/005* (2013.01); *H01G 4/224* (2013.01); *H01G 4/228* (2013.01); *H01G 4/385* (2013.01)

(58) Field of Classification Search
CPC .......... G01G 4/224; G01G 4/38; G01G 4/236; G01G 4/248; H01G 11/00; B60L 11/005; B60L 11/00; H02M 7/5387
(Continued)

(56) References Cited

U.S. PATENT DOCUMENTS 8,670,223 B2 * 3/2014 Imamura .................. H01G 2/04
361/323
9,964,657 B2 * 5/2018 Arnaud ..................... G01V 3/02
(Continued)

FOREIGN PATENT DOCUMENTS

CN 202352523 U * 7/2012 ............. H01G 4/224
CN 202352523 U * 7/2012 ............... H01G 4/38
(Continued)

*Primary Examiner* — Fritz M Fleming
*Assistant Examiner* — Jagdeep S Dhillon
(74) *Attorney, Agent, or Firm* — Calfee, Halter & Griswold LLP

(57) ABSTRACT

The present disclosure discloses an electric vehicle and a capacitor, the capacitor is configured to be connected to a DC bus of an electric vehicle and an insulated gate bipolar transistor, comprising a housing, groups of capacitor cores and groups of connecting terminals. The capacitor comprises a plurality of groups of capacitor cores, multiple groups of capacitor cores are independently disposed in the housing, each group of the capacitor cores comprises at least one capacitor core; the capacitor comprises a plurality of groups of connecting terminals, multiple groups of connecting terminals are disposed on the housing and connected to multiple groups of capacitor cores in an one-to-one manner, and each group of connecting terminals comprises a pair of electrodes protruding from the housing such that the pair of electrodes can be connected to a DC bus of an electric vehicle and an insulated gate bipolar transistor.

11 Claims, 3 Drawing Sheets

(51) Int. Cl.
*H01G 4/228* (2006.01)
*B60L 11/00* (2006.01)
*H01G 4/40* (2006.01)

(58) Field of Classification Search
USPC ..... 307/9.1, 10.1, 10.2, 66, 64, 82; 361/502, 361/509, 501
See application file for complete search history.

(56) References Cited

U.S. PATENT DOCUMENTS

| | | | | |
|---|---|---|---|---|
| 2008/0089012 A1* | 4/2008 | Kon | ........................ | H01G 11/24 |
| | | | | 361/502 |
| 2015/0256096 A1* | 9/2015 | Nishizawa | ............... | H01G 2/04 |
| | | | | 363/131 |
| 2015/0276961 A1* | 10/2015 | Arnaud | ................... | G01V 3/02 |
| | | | | 324/326 |
| 2015/0340966 A1* | 11/2015 | Mutsuura | .............. | H02M 7/003 |
| | | | | 363/98 |
| 2016/0197604 A1* | 7/2016 | Iwabuki | ................. | H01H 9/541 |
| | | | | 327/109 |

FOREIGN PATENT DOCUMENTS

| | | | | |
|---|---|---|---|---|
| WO | WO 2016076452 A1 * | 5/2016 | ............. | H01G 4/236 |
| WO | WO-2016076452 A1 * | 5/2016 | ............. | H01G 4/236 |

\* cited by examiner

ELECTRIC VEHICLE AND CAPACITOR THEREOF

CROSS-REFERENCE TO RELATED APPLICATION

This application is a national phase of International Application No. PCT/CN2015/073010 filed Feb. 13, 2015, which claims priority to, and benefits of Chinese Patent Application Serial No. 201420198946.9, filed with the State Intellectual Property Office of P. R. C. on Apr. 22, 2014, the entire contents of which are incorporated herein by reference.

TECHNICAL FIELD

The present disclosure relates to the field of vehicle technology, and more specifically, to a capacitor of an electric vehicle and an electric vehicle comprising the capacitor.

BACKGROUND

In the primary stage of electric vehicle development, general-industrial grade capacitor is always adopted to meet the needs of the electric performance, besides the electric performance, the electric vehicle has a high requirement for electrical performance and vibration performance of components. But the design of industrial grade products does not take into account the effect of vibration to the product. And at present, a capacitor of an electric vehicle on the market has two pairs of connecting terminals, one pair for being connected to IGBT and the other pair for being connected to a DC bus, which results in complex design of internal electrode of the capacitor and high cost.

SUMMARY

The present disclosure seeks to solve at least one of the technical problems in the related art to some extent. Therefore, a first purpose of the present disclosure is to provide a capacitor of an electric vehicle, of which groups of capacitor cores are connected to a DC bus of an electric vehicle and an insulated gate bipolar transistor via a pair of electrodes.

A second purpose of the present disclosure is to provide an electric vehicle having the capacitor.

The capacitor according to the present disclosure is configured to be connected to the DC bus of the electric vehicle and the insulated gate bipolar transistor, the capacitor includes a housing, groups of capacitor cores and groups of connecting terminals. The capacitor includes a plurality of groups of capacitor cores, the multiple groups of capacitors are independently disposed in the housing and each group of capacitor cores includes at least one capacitor core; the capacitor includes a plurality of groups of connecting terminals, the multiple groups of connecting terminals are disposed on the housing, multiple groups of connecting terminals are connected to multiple groups of the capacitor cores in an one-to-one manner, and each group of the connecting terminals includes a pair of electrodes protruding from the housing and being connected to the DC bus of the electric vehicle and the insulated gate bipolar transistor.

The capacitor according to the present disclosure includes multiple groups of capacitor cores, each group of capacitor cores is led out via a pair of electrodes, the pair of electrodes is connected to the DC bus and the insulated gate bipolar transistor respectively. That is, multiple groups of capacitor cores are integrated in one capacitor independently, therefore, the capacitor may be installed easily, and a vibration reliability of the capacitor may be ensured. Each group of capacitor cores is connected to the DC bus and the insulated gate bipolar transistor, such that internal structure of the capacitor may be simple, the amount of electrodes of the capacitor may be decreased and the cost of the capacitor may be reduced.

In addition, the capacitor according to the present disclosure can also have the following additional technical features:

In some embodiments, the multiple pairs of electrodes are disposed on a first sidewall of the housing and spaced apart from each other; and a slot is disposed on a bottom wall of the housing and configured to fix a conducting wire connected to the DC bus and the electrodes. Then, the slot disposed on the capacitor may accommodate the conducting wire of the capacitor connected to the DC bus therein, so as to make the conducting wire ordered and non-overlapped when connecting the capacitor, such that the connection of the capacitor may be easier and security of the capacitor connection may be improved.

In some embodiments, the capacitor includes a plurality of the slots, multiple slots corresponds to the multiple pairs of electrodes in an one-to-one manner, an entrance of the slot and the first sidewall of the housing are at the same plane, and an exit of the slot and a second sidewall of the housing are at the same plane, therefore the conducting wires could be connected to the electrodes and the DC bus, and then, it may be convenient for the connection and installation of the capacitor and the efficiency of the installation of the capacitor may be improved.

In some embodiments, Each slot includes a first slot and a second slot perpendicular to the first slot, and the first slot and the second slot are spaced apart from each other. Then, a space utilization may be improved. And it is avoided that all of the conducting wire are fixed in the slot. Even if a length of the conducting wire and an extension length of the slot are different due to machining error, the conducting wire could also be fixed in the slot quickly and avoid from being loose, moreover, spacing arrangement could improve an efficiency of fixing the conducting wire in the slot.

In some embodiments, a first ridge and a second ridge are disposed on the bottom wall of the housing, the first ridge and the second ridge are parallel to each other and spaced apart from each other to form the first slot. Therefore, a structure of the housing may be simple, the problem that slotting on the housing may thin a thickness of local location may be avoided and structure strength of the housing may be improved.

In some embodiments, a first protrusion is disposed on an inner wall of the first ridge, a first gap is disposed on the second ridge corresponding to the first protrusion. Then the conducting wires can be fixed in the first slot and an efficiency of fixing the conducting wires may be improved.

In some embodiments, multiple third ridges are disposed on the bottom wall of the housing and spaced apart from each other to form the second slot. Therefore, the structure of the housing may be simple and it is convenient to forming the second slot.

In some embodiments, a second protrusion is disposed on an inner wall of one of two third ridges which forms the second slot, a second gap corresponding to the second protrusion is disposed on the other one of two third ridges which forms the second slot. Therefore, the conducting wire may be fixed steadily in the second slot via the second protrusion, and the second gap may make it easier to fix the conducting wire in the second slot, thus an efficiency of fixing the conducting wire in the second slot may be improved.

The present disclosure also provides an electric vehicle, which includes an insulated gate bipolar transistor, a DC bus and a capacitor. The capacitor is any one of the capacitor mentioned above, a pair of electrodes of a group of connecting terminals of the capacitor is electrically connected to the insulated gate bipolar transistor and the DC bus.

The electric vehicle according to the present disclosure, the capacitor connected to the insulated gate bipolar transistor and the DC bus is the preceding capacitor according to the present disclosure. Therefore, multiple groups of capacitor cores are independently integrated in one capacitor, such that the capacitor may be installed easily, a vibration reliability of capacitor may be guaranteed at the same time. Each group of capacitor cores is connected to the DC bus and the insulated gate bipolar transistor via a pair of electrodes, thus, an internal structure of the capacitor may be simple, the amount of the electrode may be decreased and the cost of the electric vehicle may be reduced.

In some embodiments, The electrodes are connected to the insulated gate bipolar transistor directly and connected to the DC bus via the conducting wire. Therefore, the capacitor may be installed easily and the installation efficiency of the capacitor may be improved.

In some embodiments, a fixing terminal is disposed at an end of the conducting wire, and the conducting wire is connected to the electrode via the fixing terminal.

Figure 1:
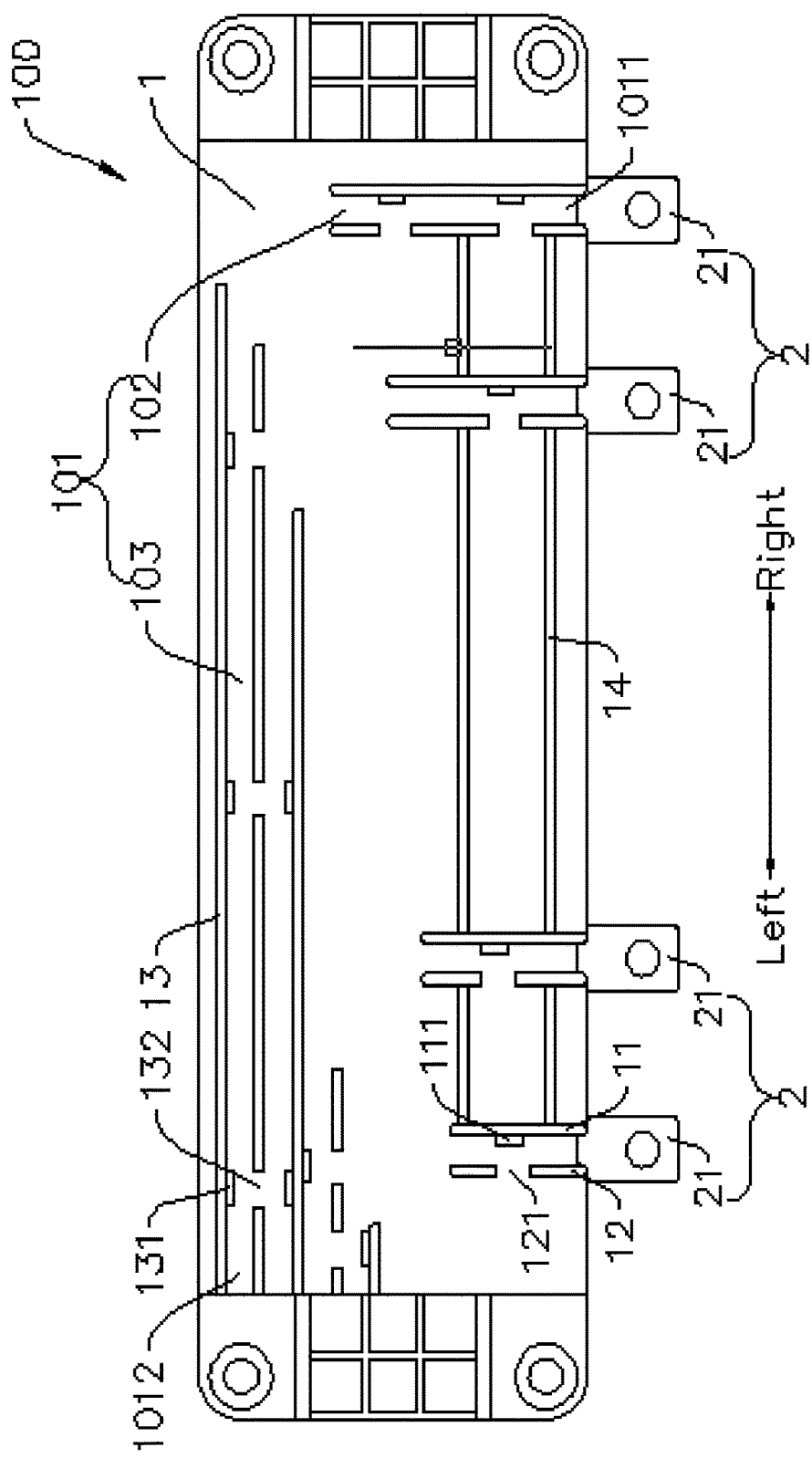
FIG. 1 is a schematic diagram of a capacitor of an electric vehicle according to an embodiment of the present disclosure.

Reference number: capacitor 100; housing 1; connecting contact point 2; slot 101; first slot 102; second slot 103; accommodating cavity 104; entrance of the slot 101 1011; exit of the slot 101 1012; first ridge 11; second ridge 12; third ridges 13; strengthen ridge 14; first protrusion 111; first gap 121; second protrusion 131; second gap 132; electrode 21;

Insulated gate bipolar transistor 200;

Wire 300.

DETAILED DESCRIPTION

Embodiments of the present disclosure are described in detail below, and examples of the embodiments are shown in accompanying drawings, wherein identical or similar marks denote identical or similar components or components with the same or similar function from beginning to end. The following embodiments described by referring to the accompanying drawings are illustrative, aim at explaining the present disclosure, and should not be interpreted as limitations to the present disclosure.

In the description of the present disclosure, it should be understood that, location or position relationships indicated by the terms, such as "center", "longitude", "transverse", "length", "width", "thickness", "up", "down", "front", "rear", "left", "right", "vertical", "horizontal", "top", "bottom", "within", "outside", "clockwise", "counterclockwise", "axial", "radial", and "circumferential" are location or position relationships based on illustration of the accompanying drawings, are merely used for describing the present disclosure and simplifying the description instead of indicating or implying the indicated apparatuses or elements should have specified locations or be constructed and operated according to specified locations, and Thereof, should not be intercepted as limitations to the present disclosure.

In addition, the terms such as "first" and "second" are used merely for the purpose of description, but shall not be construed as indicating or implying relative importance or implicitly indicating a number of the indicated technical feature. Hence, the feature defined with "first" and "second" may explicitly or implicitly include at least one of the features. In the description of the present disclosure, unless otherwise explicitly specifically defined, "multiple" means at least two, for example, two or three.

In the present disclosure, unless otherwise explicitly specified or defined, the terms such as "mount", "connect", "connection", and "fix" should be interpreted in a broad sense. For example, a connection may be a fixed connection, or may be a detachable connection or an integral connection; a connection may be a mechanical connection, or may be an electrical connection; a connection may be a mechanical connection, or may be an electrical connection, or may be used for intercommunication; a connection may be a direct connection, or may be an indirect connection via an intermediate medium, or may be communication between interiors of two elements or an interaction relationship between two elements, unless otherwise explicitly defined. It may be appreciated by those of ordinary skill in the art that the specific meanings of the aforementioned terms in the present disclosure can be understood depending on specific situations.

In the present disclosure, unless otherwise explicitly specified or defined, a first feature being "above" or "below" a second feature may be that the first and second features are in direct contact or that the first and second features in indirect contact by means of an intermediate medium. In addition, the first feature being "over", "above" or "on the top of" a second feature may be that the first feature is over or above the second feature or merely indicates that the horizontal height of the first feature is higher than that of the second feature. The first feature being "underneath", "below" or "on the bottom of" a second feature may be that the first feature is underneath or below the second feature or merely indicates that the horizontal height of the first feature is lower than that of the second feature.

In the primary stage of electric vehicle development, general-industrial grade capacitor is always adopted to meet the needs of the electric performance. Besides the electric performance, the electric vehicle has a high requirement for electrical performance and vibration performance of components. But the design of industrial grade products does not take into account the effects of vibration to the product. And at present, a capacitor of an electric vehicle on the market has two pairs of terminals, one pair for being connected to IGBT and the other pair for being connected to a DC bus, which results in complex design of internal electrode of the capacitor and high cost due to relative more number of the electrode. Therefore, the present disclosure provides a capacitor of an electric vehicle, of which each group of the capacitor cores is connected to a DC bus and an insulated gate bipolar transistor via a pair of electrodes, and the capacitor is specifically configured to be connected to the DC bus of the electric vehicle and the insulated gate bipolar transistor.

The capacitor 100 according to embodiments of the present disclosure will be described in detail below by referring to the drawings.

Figure 2:
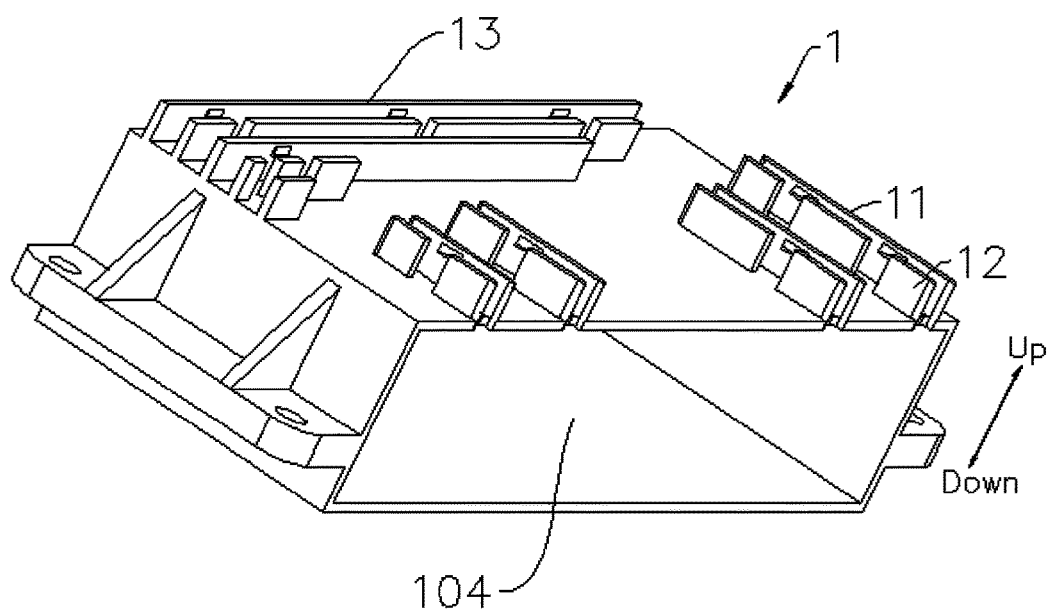
FIG. 2 is a schematic diagram of a housing of a capacitor of a electric vehicle according to an embodiment of the present disclosure.
Figure 3:
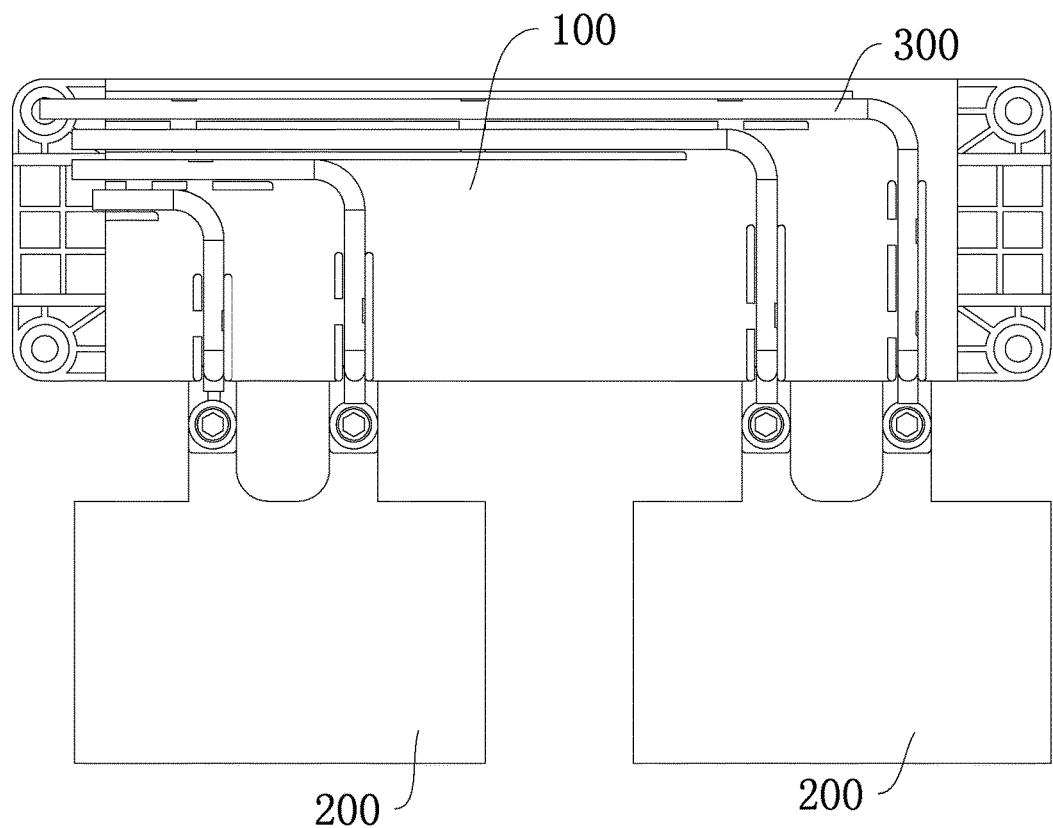
FIG. 3 is a view of a capacitor coupled with an insulated gate bipolar transistor and wire from one perspective according to an embodiment of the present disclosure.
Figure 4:
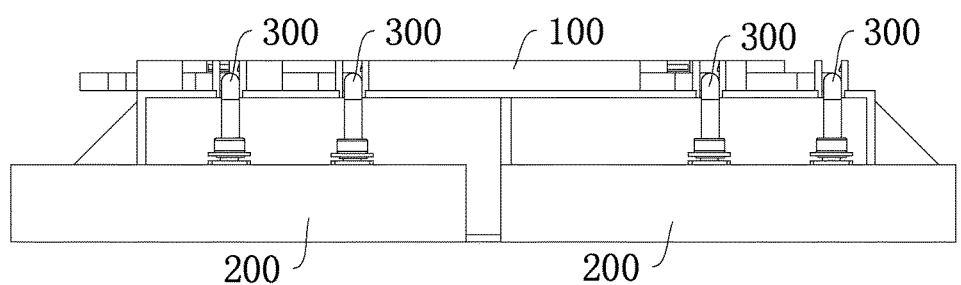
FIG. 4 is a view of a capacitor coupled with an insulated gate bipolar transistor and wire from another perspective according to an embodiment of the present disclosure.
Figure 5:
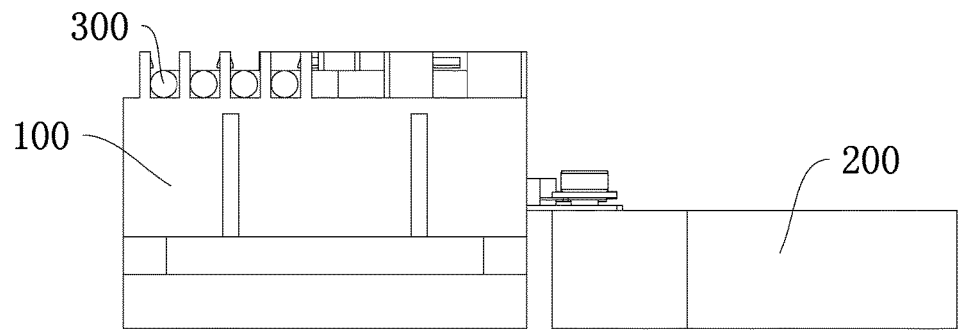
FIG. 5 is a view of a capacitor coupled with an insulated gate bipolar transistor and wire from yet another perspective according to an embodiment of the present disclosure.

As shown in FIG. 1 and FIG. 2, the capacitor 100 according to the embodiments of the present disclosure includes a housing 1, groups of capacitor cores (not shown) and groups of connecting terminals 2.

Specifically, the capacitor includes a plurality of groups of capacitor cores, multiple groups of capacitor cores independently disposed in the housing 1, each group of the capacitors is equivalent to a capacitor working independently and includes one or more capacitor cores (not shown). Further, multiple groups of capacitor cores are disposed independently means that there is no connection between every two groups of capacitor cores, and multiple groups of capacitor cores work independently. The capacitor includes multiple groups of connecting terminals 2 disposed on the housing 1, multiple groups of the connecting terminals 2 is connected to multiple groups of the capacitor cores in an one-to-one manner and each group of the connecting terminals 2 includes a pair of electrodes 21 (namely two electrodes 21) protruding from the housing 1. Further, the pair of electrodes of the connecting terminals 2 is configured to connected to the DC bus and the insulated gate bipolar transistor 200 (namely IGBT).

The capacitor 100 according to the embodiments of the present disclosure includes a plurality of groups of capacitor cores, and each group of capacitor cores is led out via a pair of electrodes 21, the pair of electrodes is connected to the DC bus and the insulated gate bipolar transistor 200. That is, multiple groups of capacitor cores are independently integrated in one capacitor, therefore, the capacitor may be installed easily, and a vibration reliability of the capacitor may be ensured. Each group of capacitor cores is electrically connected to the DC bus of the electric vehicle and the insulated gate bipolar transistor via a pair of electrodes 21, such that the internal structure of the capacitor 100 may be simple, the amount of the electrodes 21 of the capacitor 100 may be decreased, and cost of the capacitor 100 may be reduced.

The capacitor 100 is connected to the insulated gate bipolar transistor and DC bus of an electric vehicle via a pair of electrodes 21, the electrodes 21 are connected to the insulated gate bipolar transistor 200 directly, and connected to the DC bus via the conducting wire.

In addition, a pair of electrodes 21 of each group of connecting terminals 2 is connected to the insulated gate bipolar transistor, a pair of electrodes 21 of each group of connecting terminals 2 is connected to the DC bus at the same time.

Further, each group of connecting terminals 2 is connected to the insulated gate bipolar transistor and the DC bus at the same time. As shown in FIG. 1, in some embodiments of the present disclosure, the electrodes 21 are connected to the DC bus (not shown) via the conducting wire 300, according to FIG. 1 to FIG. 5, multiple electrodes 21 are disposed on a first sidewall of the housing 1 and spaced apart from each other (namely the front sidewall of the housing 1 as shown in FIG. 1), and multiple slots 101 are disposed on the bottom wall of the housing 1 correspond to multiple electrodes 21. The conducting wire 300 connected to the electrodes 21 and the DC bus is fixed via the slot 101 avoiding loose and wobbling of the conducting wire 300 which may result in unstable connection between the electrode 21 and the DC bus. Therefore, the slots 101 are disposed on the capacitor 100, which can fix the conducting wire 300 connected 100 to the capacitor with the DC bus therein, so that when the capacitor 100 is connected to the DC bus, the conducting wire is ordered and non-overlapped, thus to make the connection of the capacitor more convenient and improve security of the capacitor connection.

Those of ordinary skill in the art can understand that it makes no difference without disposing the slots 101, without devices that fixing the conducting wires 300 connected the electrodes 21 and the DC bus or using other fixing structures to fixing the conducting wire 300.

Further, as shown in FIG. 1, the capacitor includes a plurality of the slots 101 in correspondence to multiple electrodes 21 in an one-to-one manner, the entrances 1011 of the slots 101 and the first sidewall of the housing 1 (that is the front sidewall of the housing 1 shown in FIG. 1) are in the same plane, such that the conducting wire 300 fixed in the slots 101 can be connected to the electrodes 21. And the exits 1012 of the slots 101 and the second sidewall of the housing 1 (that is the left sidewall of the housing 1 shown in the FIG. 1) are disposed in the same plane, in order to facilitate leading out the conductive wires fixed in the slot 101. Therefore, it is convenient to connect the conducting wires 300 with the electrodes 21 and the DC bus, such that the capacitor 100 may be connected and installed easily, and the efficiency of the installation of the capacitors 100 may be improved.

Beneficially, as shown in FIG. 1, each slot 101 includes a first slot 102 and a second slot 103 perpendicular to the first slot 102. In the installation process of the capacitor 100, the electrodes 21 are connected to the insulated gate bipolar transistor directly, while one end of the conducting wire connected to the DC bus is connected to the electrode 21 and the other end of the conducting wire is led out from the sidewall of the capacitor 100, therefore, the DC bus connecting to the electric vehicle may be avoided from being led out from a sidewall opposite to the sidewall on where the electrodes are disposed, thus to avoid occupying large space and improve space utilization.

In other words, if the slots 101 are designed to have a straight line shape, the entrances 1011 of the slots 101 and the front sidewall of the housing 1 are in the same plane, while the exits 1012 of the slots 101 extend to the back sidewall of the housing 1, then one end of the conducting wire fixed in the slots 101 can be connected to the electrode 21 easily, while the other end of the conducting wire fixed in the slot 101 is led out from the upper sidewall of the housing 1, because of the direct connection between the electrode 21 and the insulated gate bipolar transistor 200, the conducting wire led out from the back side of the housing 1 may occupy a large space and it may be difficult to connect the conductive wire with the DC bus.

Further, as shown in FIG. 1, the first slot 102 and the second slot 103 are spaced apart from each other. Therefore, it is avoided that all of the conducting wire are fixed in the slot 101. Even if a length of the conducting wire 300 and an extension length of the slot 101 are different due to machining error, the conducting wire 300 could also be fixed in the slot 101 quickly and avoid from being loose, moreover, spacing arrangement could improve an efficiency of fixing the conducting wire 300 into the slot 101.

With the first slot 102 and the second slot 103 spaced apart from each other, the conducting wire 300 could be fixed steadily within the slot 101 when the conducting wire 300 is too long or too short, moreover, when the conducting wire 300 is fixed into the slot 101, the conducting wire 300 can be fixed steadily only by fixing one end of the conducting wire 300 in the first slot 102 and fixing the other end of the conducting wire 300 in the second slot 103. So that the conducting wire 300 could be easily fixed in the slot 101, and the installation efficiency of the conducting wire 300 may be improved.

Beneficially, as shown in FIG. 1, a first ridge 11 and a second ridge 12 are disposed on the bottom wall of the housing 1, the first ridge 11 and the second ridge 12 are parallel to each other and spaced apart from each other to form the first slot 102. Therefore, the structure of the housing 1 may be simple, and the problem that slotting on the housing may thin a thickness of local location may be avoided, and the structure strength of the housing 1 may be improved.

Certainly, the housing 1 can also be excavated directly to form the first slots 102.

Further, as shown in FIG. 1, a reinforcing rib 14 is disposed on outer lateral walls of two first adjacent slots 102, so that the structure strength of the housing 1 and the stability of the first slots 102 to fixing the conducting wire may be improved.

Beneficially, a first protrusion 111 is disposed on an inner wall of the first ridge 11, a first gap 121 is disposed on the second ridge 12 corresponding to the first protrusion 111. Therefore, the conducting wire 300 can be fixed stably in the first slot 102 via the first protrusion 111 and the first gap 121 corresponding to the first protrusion 111 makes it easier to fix the conducting wire 300 in the first slot 102, so that the efficiency of fixing the conducting wire in the first slot 102 may be improved.

In addition, at least one of the first ridge 1*l* and the second ridge 12 can be design to have a shape of which a free end inclines inwardly, thereby, forming a structure having a small opening and large internal space, which may also fix the conducting wire 300 stably.

As shown in FIG. 1 and FIG. 2, in some embodiments of the present disclosure, multiple third ridges 13 are disposed on the bottom wall of the housing 1 and spaced apart from each other to form the second slots 103. Therefore, the structure of the housing 1 may be simple and it may be easy to form the second slots 103.

Certainly, the structure of the second slots 103 can be set to a structure similar to the structure of the first slots 102, for example, each second slot 103 can be formed by two disjunctive ridges and ridges of multiple second slots 103 are not shared. Forming multiple second slots 103 in this way may easily make the structure of the housing 1 complicated and it may be not easy for the molding of the housing 1.

Further, as shown in FIG. 1, a second protrusion 131 is disposed on an inner wall of one of two adjacent third ridges 13 which forms the second slot 103, a second gap 132 corresponding to the second protrusion 131 is disposed on the other one of two third ridges 13 which forms the second slot 103. Therefore, the conducting wires 300 can be fixed in the second slots 103 via the second protrusion 131 and the second gap 132 corresponding to the second protrusion 131 may make it easier to fix the conducting wires 300 in the second slots 103. Then, the efficiency of fixing the conducting wires 300 in the second slots 103 may be improved.

In addition, multiple third ridges 13 can be matched to form a structure having a small opening and a big inner space which can also fix the conductive wires steadily.

Beneficially, the housing 1 is formed integrally, thereby improving the structure strength of housing 1, making the molding of the housing 1 more easy, improving molding efficiency of the housing 1, and reducing cost of molding the housing 1.

A capacitor 100 according to an embodiment of the present disclosure will be described in detail below by referring to the drawings.

As shown in FIG. 1 and FIG. 2, the housing 1 defines an accommodating cavity 104 which can accommodate multiple groups of the capacitor cores, in this embodiment, two groups of the capacitor cores are disposed in the housing 1, the two groups of capacitor cores and the housing 1 are spaced apart from each other and sealed via insulation potting material, each group of the capacitor cores includes one or more capacitor cores, a group of capacitor cores is electronically connected to a pair of electrodes 21 (namely two electrodes) respectively via conductive plates draw forth from the metal spraying layer of two ends of the capacitor cores, and this two groups of capacitor cores are independent from each other. In this embodiment, capacitor cores and groups of capacitor cores could be any common capacitor cores and groups of capacitor cores in the art, hence, there is no need to detailedly describes the capacitor cores and the groups of capacitor cores, those of ordinary skill in the art could understand the structure, composition and working principles of the capacitor cores and the groups of capacitor cores.

The capacitors 100 according to the present disclosure can be connected to the DC bus (or the power cord) of an electric vehicle and the insulated gate bipolar transistor respectively. The electrodes 21 of the capacitor 100 are connected to the insulated gate bipolar transistor directly and connected to the DC bus via the conducting wire 300. A fixing terminal can be disposed at an end of the conducting wire 300 so that the conducting wire 300 can be connected to the electrode 21 expediently and steadily. In order to connect the conducting wire 300 with the electrode 21 steadily, and make the conducting wire 300 be ordered and non-overlapped, the slots 101 are disposed on the housing 1 in the present disclosure, so that the conducting wire 300 can be fixed in the slot 101 steadily and orderly.

Specifically, referring to FIG. 1, four slots 101 are disposed on the housing 1, corresponding to four electrodes 21, in this embodiment, each slot 101 includes a first slot 102 and a second slot 103, a first ridge 11 and a second ridge 12 are parallel to each other and spaced apart from each other to form the first slot 102. A first protrusion 111 is disposed on an inner wall of the first ridge 11, a first gap 121 is disposed on the second ridge 12 corresponding to the first protrusion 111. Five third ridges 13 parallel to each other are disposed on the housing 1 and spaced apart from each other to form four second slots 103, in this embodiment, a second protrusion 131 is disposed on an inner surface of two outermost third ridges 13 of the five third ridges 13 and a second protrusion 131 is disposed on two surfaces of a middlemost third ridge 13, a second gap 132 corresponding to the second protrusion 131 is disposed on other two third ridges 13.

Two mutually independent groups of capacitor cores are integrated in this embodiment, it may be installed easily, and vibration reliability of an electric vehicle may be ensured. Each group of capacitor cores is led out via a pair of electrodes, so that interior design may be simple, and manufacturing cost may be saved.

With the capacitors 100 according to the present disclosure, the capacitors could be connected to multiple groups of capacitor cores and the DC bus at the same time without interference. and a pair of electrodes can be connected to IGBT and the DC bus at the same time. The capacitor is connected to the IGBT via inserting manner, and connected to the DC bus via the conducting wire 300, a fixing terminal is disposed at an end of the conducting wire 300, the conducting wire 300 is connected to the electrode 21 of the capacitor 100. When the conductive wire 300 is connected to the electrode, the conductive wire 300 could be fixed in the slots 101 on the housing, orderly arranged and non-overlapped to ensure security under high voltage.

In the present disclosure, a pair of electrode is adopted to achieve the capability that the capacitor 100 can be connected to the DC bus and the insulated gate bipolar transistor at the same time, and the conducting wire is ordered and non-overlapped, thereby ensuring security under high voltage and saving manufacturing cost of the capacitor.

The capacitor according to the present disclosure could be a film capacitor.

With the capacitor of an electric vehicle according to the present disclosure, when the electrode 21 is connected to IGBT and DC bus, the capacitor is connected to IGBT via inserting manner, and connected to DC bus via the conducting wire 300, a fixing terminal is disposed at an end of the conducting wire 300, the conducting wire 300 is connected to the electrodes of the capacitor via the terminal, thus a pair of electrodes could be connected to IGBT and DC bus at the same time. The capacitor is connected to DC bus via the conductive wires 300, then there is no need to lead out another pair of electrodes from the inside of the capacitor to connect to DC bus, thus to save the cost. The DC bus is connected to the electrode via the conducting wire 300 with a fixing terminal disposed at an end of it, the conducting wire 300 can be fixed in the slots 101 disposed on the housing orderly and non-overlapped, thus to ensure security under high voltage. Two independent capacitors are disposed within a same housing, and the fixed end of the housing adopts a hollow design, which may greatly enhance an anti-vibration performance of the product.

The electric vehicle according to a second aspect of the present disclosure includes a capacitor 100, an insulated gate bipolar transistor 200 and a DC bus (not shown).

Specifically, the capacitor 100 is the capacitor of an electric vehicle according to a first aspect of the present disclosure, connecting terminals 2 of the capacitor 100 is connected to the insulated gate bipolar transistor 200 and DC bus respectively.

The electric vehicle according to the present disclosure, the capacitor 100 connected to the DC bus and the insulated gate bipolar transistor 200 adopts the capacitor of an electric vehicle according to the embodiment of the first aspect of the present disclosure. Therefore, multiple mutually independent capacitor cores are integrated in one capacitor, so that the capacitor may be installed easily and vibration reliability of the capacitor may be ensured at the same time. Each group of capacitor cores is electrically connected to the DC bus of an electric vehicle and the insulated gate bipolar transistor via a pair of electrodes 21, so that the internal structure of the capacitor 100 is simple and the amount of electrodes 21 of the capacitor 100 may be decreased, the cost of the electric vehicle may be reduced.

In one embodiment of the present disclosure, the electrodes 21 are connected to the insulated gate bipolar transistor 200 directly and the electrodes 21 are connected to the DC bus via the conducting wires 300. So that the capacitor 100 may be installed easily and the installation efficiency may be improved.

Specifically, a connecting piece is disposed on the insulated gate bipolar transistor 200, a first screw connecting hole is disposed on the connecting piece, a second screw connecting hole is disposed on the electrode 21. By stacking the electrode 21 on the connecting piece and aligning the first screw connecting hole with the second screw connecting hole, the electrode 21 is connected to the connecting piece vie a screw.

Those of ordinary skill in the art can understand that connecting manner of the electrode 21 and the insulated gate bipolar transistor 200 can be replaced by other method. A fixing terminal is disposed at an end of the conducting wire 300 and the conducting wire 300 is connected to the electrodes 21 via the fixing terminal. So that the conducting wire is connected to the electrodes 21 steady, then stability and security of the electric vehicle may be improved.

In the descriptions of this specification, a description of a reference term such as "an embodiment", "some embodiments", "examples", "specific examples", or "some examples" means that a specific feature, structure, material, or characteristic that is described with reference to the embodiment or the example is included in at least one embodiment or example of the present disclosure. In this specification, exemplary descriptions of the foregoing terms do not necessarily refer to a same embodiment or example. In addition, the described specific feature, structure, material, or characteristic may be combined in a proper manner in any one or more embodiments or examples. Moreover, if there is no contradiction, those skilled in the art can joint and combine different embodiments or examples described in the this description and features of different embodiments or examples.

Although the embodiments of the present disclosure have been shown and described, those of ordinary skill in the art can understand that multiple changes, modifications, replacements, and variations may be made to these embodiments without departing from the principle and purpose of the present disclosure.

What is claimed is:

1. A capacitor of an electric vehicle, comprising:
   a housing;
   multiple groups of capacitor cores independently disposed in the housing, each group of the capacitor cores comprising at least one capacitor core,
   wherein each group of capacitor cores are operationally independent from each other group of capacitor cores; and
   multiple groups of connecting terminals disposed on the housing and connected to the multiple groups of capacitor cores in a one-to-one manner,
   wherein each group of the connecting terminals comprises a pair of electrodes, the pair of electrodes protrudes from the housing, such that the pair of electrodes can be connected to a DC bus of the electric vehicle and an insulated gate bipolar transistor.

2. The capacitor according to claim 1, wherein the multiple pairs of electrodes are disposed on a first sidewall of the housing and spaced apart from each other; and a slot is disposed on a bottom wall of the housing and configured to fix a conducting wire connected to the DC bus and the electrodes.

3. The capacitor according to claim 2, wherein the capacitor comprises a plurality of the slot corresponding to the multiple pairs of electrodes in an one-to-one manner, an entrance of the slot and the first sidewall of the housing are at the same plane, and an exit of the slot and a second sidewall of the housing are at the same plane.

4. The capacitor according to claim 3, wherein each slot comprises a first slot and a second slot perpendicular to the first slot, and the first slot and the second slot are spaced apart from each other.

5. The capacitor according to claim 4, wherein a first ridge and a second ridge are disposed on the bottom wall of the housing, the first ridge and the second ridge are parallel to each other and spaced apart from each other to form the first slot.

6. The capacitor according to claim 5, wherein a first protrusion is disposed on an inner wall of the first ridge, a first gap is disposed on the second ridge corresponding to the first protrusion.

7. The capacitor according to claim 4, wherein multiple third ridges are disposed on the bottom wall of the housing and spaced apart from each other to form the second slot.

8. The capacitor according to claim 7, wherein a second protrusion is disposed on an inner wall of one of two third ridges which forms the second slot, a second gap corresponding to the second protrusion is disposed on the other one of two third ridges which forms the second slot.

9. An electric vehicle, comprising:
an insulated gate bipolar transistor;
a DC bus; and
a capacitor according to claim 1,
wherein the pair of electrodes are electrically connected to the DC bus and the insulated gate bipolar transistor.

10. The electric vehicle according to claim 9, wherein the electrode is connected to the insulated gate bipolar transistor directly and connected to the DC bus via a conducting wire.

11. The electric vehicle according to claim 9, wherein a fixing terminal is disposed at an end of the conducting wire, the conducting wire is connected to the electrode via the fixing terminal.

* * * * *